United States Patent Office 3,745,018
Patented July 10, 1973

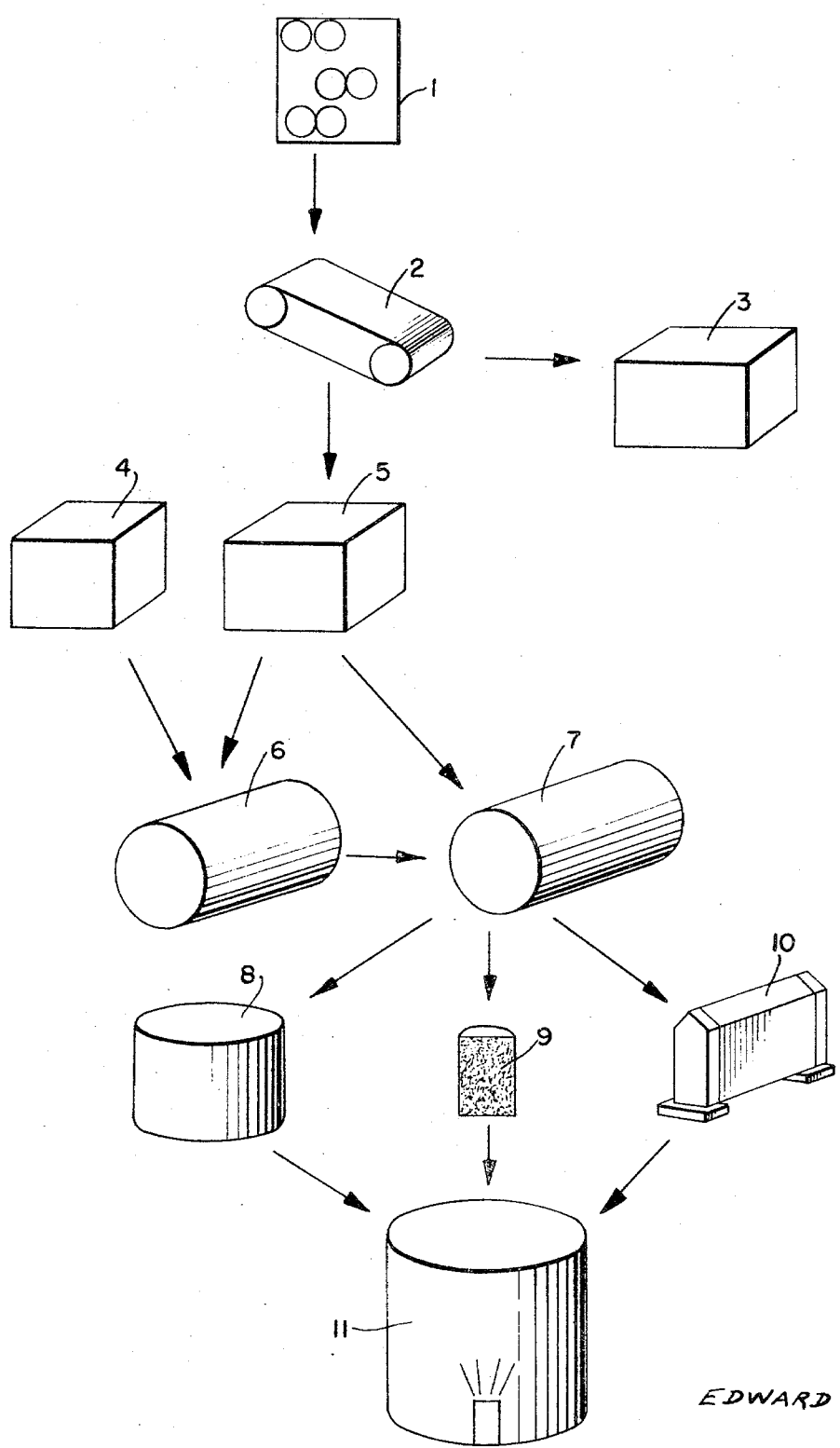

3,745,018
HUSK-FREE MASH PROCESS
Edward F. Schuler, Hoffman Estates, Ill., assignor to Baxter Laboratories, Inc., Morton Grove, Ill.
Filed Aug. 5, 1971, Ser. No. 169,392
Int. Cl. C12c 7/00
U.S. Cl. 99—52                                11 Claims

ABSTRACT OF THE DISCLOSURE

A method of making a malt wort in which the husks of malt are removed prior to mashing to produce a husk-free mash. Malt is finely ground, and the malt husks are separated from the flour. The malt and adjunct are subsequently processed in a manner whereby the adjunct is liquified in the cooker and then added to the husk-free malt in the mash-tun where saccharification takes place. At the completion of saccharification, the insoluble fractions of malt and adjunct are filtered or centrifuged from the mash. As sparging is unnecessary when the husks are not present in the mash, the time required for the brewhouse cycle is greatly reduced.

BACKGROUND OF THE INVENTION

The present invention relates to the art of brewing and, more particularly, to an improved process for making wort in which the conventional sparging operation is eliminated by removing the husks of the malt prior to mashing.

Mashing is the process whereby, with the aid of enzymes, as much as possible of the valuable substances of the brewing materials is made soluble. The malt to be used in the brewing is crushed in order to make the substances to be extracted accessible to the water. The brewing materials are infused with a suitable amount of water and the resulting mixture is called a mash. During mashing, the mash is subjected to enzymatic action by the natural enzymes present in the malt. The resulting malt extract is dissolved in water and this liquid mixture, which is known in the art as wort, is boiled with hops. The boiled wort (and hops) is then fermented to produce beer.

Barley is the principal raw material of beer; during the malting process the raw, hard, flat-tasing barley is changed to a crisp, mellow, sweet-tasting malt. During malting, enzymes are activated by means of germination substances, which enzymes will break down the starch and proteins of the malt into less complex compounds which are soluble in water. Wort is an aqueous solution of these compounds.

Amylases, which split starch molecules, are activated in barley during germination, but their period of reaction occurs during the mashing. Proteases, which split proteins, are activated during the germination so that some of the proteins of the barley are split into compounds substantially soluble in water.

Adjuncts in the form of cereal products frequently comprise a part of the brewing materials used in the production of the very stable, nonsatiating, sparkling beers preferred by the American consumer. Since barley malt usually contains more enzymes than are necessary for the splitting of the available starch, the mixing of malt with larger or smaller amounts of unmalted, starchy material is widely used today. Since adjuncts are essentially starch with very little protein content, they are a source of additional alcohol, but otherwise contribute little to the color, taste, aroma or protein content of the beer.

Corn is the greatest source of cereal adjuncts; refined grits, obtained from the wet milling of corn, is the highest yielding and purest cereal adjunct. Corn grits, obtained from the dry milling of corn, is the most commonly used cereal adjunct. Rice has satisfactory brewing qualities and can be used together with or instead of corn grits, depending upon availability and price. Milo grits (sorghum) and cassava (manioc) have proved to be acceptable substitutes during grain shortages. Wheat, unmalted barley and potato starch have heretofore been used only in limited amounts and with limited success. Brewing sugar and syrups are excellent brewing materials when properly prepared and free from iron. Soybeans are often added in small amounts; they appear to aid in the nourishment of the yeast and improve fermentation, and they also contain rather large amounts of various B vitamins.

Besides the qualitative aspect, the use of adjuncts also has an economic aspect in that the various unmalted cereals are usually cheaper than the barley malt.

In the conventional brewing process, the malt is first partly crushed to make the substances to be extracted more accessible to the water.

An adjunct mash is prepared by boiling a suitable starch source in a cooker. The adjunct may be boiled with a small portion of malt to achieve liquefaction of the starch by enzymes present in the malt.

While the adjunct mash is boiling, the main portion of malt grits, containing both malt flour and malt husks, is mixed with water in a mash tun and heated gently to achieve some degradation of the malt proteins. The adjunct mash is then added, the temperature raised, and the starch is converted to carbohydrates of lower molecular weight. The adjunct mash comprises about 30% of the total.

When all the soluble substances are brought into solution by means of the mashing, the succeeding step comprises the separation of the wort from the spent grains, i.e., the undissolved part. This is generally carried out in two phases—the wort is first drawn off by filtration and the remaining wort extract is washed out by sparging. The mash is transferred from the mash tun to separate equipment for filtration. A filter bed is provided by the mash itself in the form of malt husks, which keep the bed porous during filtration. Rather than acting as a strainer, the filtration equipment merely supports the filter cake and husks.

The simplest type of mash filtration equipment is a lauter tub, which usually comprises a cylindrical tank with a false bottom of slotted plates upon which the mash settles. A set of vertical knives is affixed to a cross-arm which slowly turns around the center axis, whereby the knives cut or rake through the grain layer and prevent it from being compressed during the run-off. The lautering operation and accompanying equipment are illustrated, for example, in U.S. Pat. 3,357,837.

After the first wort is drawn off during the lautering process, the grains still contain about 80% liquid and the residual extract must be recovered by washing or sparging with hot water. Allowing for the dilution effect of the sparging water, it is necessary to regulate the concentration of the original wort to about one and one-half times as high as the desired percentage of extract in the total wort. The sparging step and apparatus employed in this operation are illustrated, for example, in U.S. Pat. 3,034,895.

The clear liquid wort produced can be used to make malt syrup or further processed to make beer. For the production of beer, the filtered liquid wort and spargings are placed in a brew kettle, wherein they are raised to the boiling point. During the boiling period of from about one to two and one-half hours, hops are added and the resulting boiled mixture, now referred to as boiled wort, is cooled and fermented to produce beer.

The foregoing process has several disadvantages. Filtration through the lauter tub requires from about one to four hours and is a cumbersome operation. In order to obtain maximum yield of wort, excessive sparging is required, which dilutes the wort and delays the entire brewhouse operation. It also tends to give an astringent taste to the wort.

SUMMARY OF THE INVENTION

The present invention provides an improved method for brewing in which the husks of malt are removed prior to the mashing process. By producing a husk-free mash, the conventional sparging operation carried out in the lauter tub is bypassed, thus substantially reducing the time required for the brewhouse cycle. Depending in part on the particular method previously employed, the brewhouse cycle can be increased by as much as twofold. The kettle cycle (i.e., the number of brews in a given amount of time) is increased because the wort passes directly into the kettle, thereby eliminating the usual delay caused by filtration and sparging. Although the partial dehusking of malt prior to mashing has been suggested heretofore in U.S. Pat. 3,443,958, French Pat. 2,042,602, and in Brewers Digest, February 1970, at p. 48 et seq., the step of complete dehusking of malt prior to mashing has not been combined with the elimination of the sparging operation in the lauter tub as described herein.

In addition to the foregoing advantages, the present process enables the use of less expensive substitutes for malt, such as barley, which tends to slow down the sparging operation in the conventional process. When raw barley is used, it can constitute as much as 50% of the grain used for the main mash, i.e., about 35% of the grain in the total mash. Thus, in a preferred embodiment of the present invention, instead of using the conventional mixture of 70% malt and 30% adjunct, a mixture of 35% raw barley, 35% malt and 30% adjunct can be used. Supplementary enzymes can be added to aid in the conversion of starch. Diastatic and proteolytic enzymes such as from plant, bacterial and fungal sources, e.g., from the papaya plant and the genera Bacilli and Aspergilli, are illustrative examples of such enzymes. A mixture of amylases, proteases and papain is particularly useful in the present invention.

In the process of the present invention, finely ground malt is passed over a vibrating screen to separate the malt from the husks. The malt flour passes to the malt hopper where it is mashed with adjunct, as in the conventional process. After the mash is converted from starch to sugar, it is pumped to a whirlpool tank, a diatomaceous earth filter, a mash filter, or any combination of these, which takes the place of the lauter tub, to remove the insoluble matter from the malt and adjunct. The wort from the filter passes directly to the kettle, eliminating the delay caused by sparging, thus reducing the overall kettle time.

BRIEF DESCRIPTION OF THE DRAWING

While the specification concludes with claims particularly pointing out and distinctly claiming the subject matter regarded as constituting the present invention, it is believed the invention will be better understood from the following description taken in connection with the drawing.

With reference to the drawing, malt is fed to the mill 1, where it undergoes crushing. The finely ground malt then passes over the vibrating screen 2, the flour passing through to the malt hopper 5 and the husks being conveyed to the husk holding tank 3. Adjunct grains from the adjunct hopper 4 and a small portion of flour from the malt hopper 5 are mixed in the cooker 6 and boiled.

The main portion of malt flour is mixed with water in a mash tun 7, the adjunct mash is added, which raises the temperature to convert the mash to sugars. The wort is then pumped to a whirlpool tank 8, a diatomaceous earth filter 9, or a mash filter 10 for separation of the insoluble fraction of malt and grits. The wort then passes to the kettle 11 to be boiled, then cooled and fermented to produce beer.

DESCRIPTION OF THE PREFERRED EMBODIMENTS

In accordance with one embodiment of the invention, malt is fed to a mill where it undergoes crushing. Conventional mills can be used for milling the malt, such as a mill provided with a plurality of rollers and a vibrating screen underneath as depicted diagrammatically in the drawing by reference numeral 1. The rollers of the mill are set to give a very fine grind. Preferably, the malt is ground to a particle size that is equivalent to a mesh screen size of from about 40 to about 80 U.S. mesh. The finely ground malt then passes along a vibrating screen, which allows the malt flour to pass through to a hopper below. A slight vacuum is applied under the screen to increase the rate of separation of flour from the masks. The husk is retained on the screen, from which it passes to the end of a conveyor, where a brush removes anything that might be trapped, to a second conveyor. The second conveyor deposits the husk into a spent grain tank.

An adjunct mash is prepared in the customary brewing manner using refined corn grits and finely ground malt flour which is free of husks. The adjunct mash contains about 1200 pounds of grits, about 120 pounds of husk-free malt flour, and about 17 barrels of water which is agitated to produce a thoroughly wet slurry. The initial mash temperature is about 130° F. and is raised to a boil in about 30 minutes; then the mash is cooked for about 15 to 30 minutes.

A malt mash is prepared from the finely ground, husk-free malt flour. The malt mash contains about 2700 pounds of malt flour and about 22 barrels of water. The cooked adjunct is pumped from the cooker 6 to the mash tun 7, and the temperature rises to approximately 160° F. At this temperature the starch is converted to dextrins and malt sugars, due to the action of the enzymes present in the malt. The conversion takes place in approximately 10 minutes.

The converted mash is then pumped to a conventional whirlpool tank shown diagrammatically by reference numeral 8 to separate the insoluble fraction of malt and grits. In the whirlpool tank, the flow in a circular movement causes the insoluble matter to form a solid cone in the center of the tank. The insolubles consist of ash, protein, cellulose, hemicellulose and other organic matter. From the whirlpool tank the wort is drawn off and may be further polished by using a diatomaceous earth filter 9 or pass directly into the kettle. The insoluble material from the whirlpool is transferred to a spent grain tank and mixed with the husk previously removed, to replace the protein. The wort from the whirlpool or diatomaceous filter passes to a kettle shown diagrammatically by reference numeral 11, which contains a predetermined amount of water. The wort is smooth tasting and not bland.

Alternatively, a malt mash can be made from about equal parts of dehusked barley and husk-free malt flour. First, an adjunct mash is prepared as in the preceding example from about 1200 pounds of grits, about 120 pounds of husk-free malt flour, and about 17 barrels of water, and then treated as above. A malt mash is then prepared from about 1350 pounds of dehusked barley and about 1350 pounds of malt in about 22 barrels of water. A commercially available mixed enzyme preparation containing diastases, phosphorylases, and proteases is supplementally added at concentrations of from about 0.05 to about 0.20% by weight of the unmalted barley base. The mashing operation then proceeds as in the preceding example.

In another embodiment of the invention, instead of using the whilpool tank, the converted mash is pumped to a conventional mash filter of the regular plate-and-frame type with filter cloth. This filtering operation takes about 20 minutes. The insoluble material from the mash filter is transferred to the spent grain tank to be reconstituted with the husks. The wort from the filter passes to the kettle.

It will be appreciated that the time for filtration is a function of the parameters of the filtering device. Even greater filtration time advantage is realized by using a larger filtering area, and up to 1000 barrels (31 U.S. gallons per barrel) of wort can be processed in 20 minutes in accordance with the present invention instead of the customary one to four hours when the lauter tub is employed.

After passage to kettle 11, the wort is then subjected to the conventional boiling, cooling and separating, fermenting and finishing steps in the brewing art. Chillproofing, as described for example in U.S. Pat. 3,366,483, is representative of these finishing steps.

If a slightly astringent or grainy taste is desired by the brewery, a portion of the removed husk can be added to the kettle during boiling, as one adds hops.

Various other examples and modifications of the foregoing examples will be apparent to the person skilled in the art after reading the foregoing specification and the appended claims without departing from the spirit and scope of the invention. All such further examples and modifications are included within the scope of the claims.

What is claimed is:

1. A process for making a husk free malt wort in which the sparging process is eliminated by removing the husks from the malt prior to mashing, comprising:
    milling malt to a particle size of from about 40 to about 80 U.S. mesh to produce a finely ground malt flour and malt husks;
    separating and removing said malt husks from said flour;
    adding water to said malt flour to form a malt mash;
    adding an adjunct mash to said malt mash, said adjunct mash comprising a mixture of a starch source, malt flour, and water;
    the resultant mixture from the two mashes thereby forming a mixture of liquid wort and insoluble grain residuals; and
    separating said liquid wort from said insoluble grain residuals.

2. The process of claim 1 wherein said liquid wort is separated from said insoluble grain residuals by centrifugation.

3. The process of claim 1 wherein said liquid wort is separated from said insoluble grain residuals by passing said mixture through a diatomaceous earth filter bed.

4. The process of claim 1 wherein said liquid wort is separated from said insoluble grain residuals by passing said mixture through a mash filter.

5. The process of claim 1 wherein said liquid wort is separated from said insoluble grain residuals first by centrifugation and then by passing the resulting supernatant liquid through a diatomaceous earth filter bed.

6. A process for making a husk free malt wort in which the sparging process is eliminated by removing the husks from the malt prior to mashing, comprising:
    milling malt to a particle size of from about 40 to about 80 U.S. mesh to produce finely ground malt flour and malt husks;
    separating and removing said malt husks from said malt flour;
    adding water to said malt flour and an amount of dehusked barley about equal in weight to said malt flour to form a malt mash;
    adding an adjunct mash to said malt mash, said mash comprising a mixture of a starch source, malt flour, and water;
    the resultant mixture from the two mashes thereby forming a mixture of liquid wort and insoluble grain residuals;
    separating said liquid wort from said insoluble grain residuals.

7. The process of claim 6 wherein said liquid wort is separated from said insoluble grain residuals by centrifugation.

8. The process of claim 6 wherein said liquid wort is separated from said insoluble grain residuals by passing said mixture through a diatomaceous earth filter bed.

9. The process of claim 6 wherein said liquid wort is separated from said insoluble grain residuals by passing said mixture through a mash filter.

10. The process of claim 6 wherein said liquid wort is separated from said insoluble grain residuals first by centrifugation and then by passing the resultant supernatant liquid through a diatomaceous earth filter bed.

11. The process of claim 6 in which supplementary enzymes are added to the mash at a concentration of from about 0.05% to about 0.20% by weight of the unmalted barley base.

References Cited
UNITED STATES PATENTS

| | | | |
|---|---|---|---|
| 3,443,958 | 5/1969 | Dennis et al. | 99—52 |
| 3,353,960 | 11/1967 | Bavisotto | 99—52 |
| 3,048,489 | 8/1962 | Blum | 99—51 |

OTHER REFERENCES

P. Kolbach "Grist, Mashing Systems and Brewhouse Yield," Abstracted in Institute of Brewing Journal, vol. 61, p. 56 (1955).

LIONEL M. SHAPIRO, Primary Examiner

R. B. PENLAND, Assistant Examiner